United States Patent
Ruben

[11] 3,905,686
[45] Sept. 16, 1975

[54] THREE ELEMENT PROJECTION LENS

[75] Inventor: Paul Lewis Ruben, Rochester, N.Y.

[73] Assignee: Eastman Kodak Company, Rochester, N.Y.

[22] Filed: Oct. 18, 1974

[21] Appl. No.: 516,238

[52] U.S. Cl.................................. 350/189; 350/226
[51] Int. Cl.² ....................... G02B 3/04; G02B 9/16
[58] Field of Search............................ 350/189, 226

[56] References Cited
UNITED STATES PATENTS
3,762,801  10/1973  Baker.............................. 350/226 X

*Primary Examiner*—Paul A. Sacher
*Attorney, Agent, or Firm*—R. F. Brothers

[57] ABSTRACT

A three element photographic projection lens having a front positive biconvex element, a middle negative biconcave element and a rear positive biconvex element. The first and second elements are formed of inexpensive plastic materials. The use of aspheric surfaces on the middle negative element helps in aberration correction. The lens is characterized by improved optical performance at a relative aperture of $f/1.80$.

2 Claims, 1 Drawing Figure

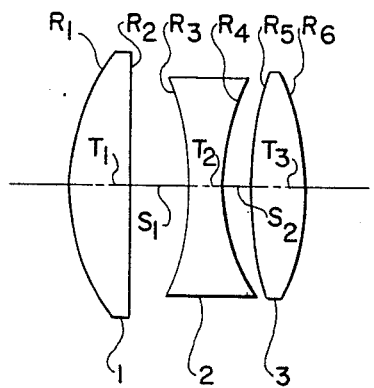

THREE ELEMENT PROJECTION LENS

BACKGROUND OF THE INVENTION

1. Field of the Invention

The present invention relates to photographic projection lenses and in particular to such lenses that comprise three air spaced elements.

2. Description of the Prior Art

Triplet lenses for use in photographic projection apparatus are well known. Such lenses were initially all glass but the use of plastic in one or more elements has become common in order to decrease the cost of the lens. However, the advent of plastic as an optical element has accentuated certain design problems.

SUMMARY OF THE INVENTION

In accordance with the present invention, there is provided a well corrected three element lens having a front positive biconvex element, a middle biconcave negative element and a rear positive biconvex element. The two positive elements have spherical refracting surfaces while the negative element has aspherical refracting surfaces. Preferably, the first two elements are formed out of polymethyl methacrylate, polycyclohexyl methacrylate, polystyrene, or acrylonitrile.

BRIEF DESCRIPTION OF THE DRAWING

In the detailed description of the preferred embodiment of the invention presented below, reference is made to the accompanying drawing which is a diagrammatic cross section of a lens according to the present invention.

DESCRIPTION OF THE PREFERRED EMBODIMENTS

For all purposes of describing or claiming of the invention, the term lens will be used to describe the complete lens and not the elements thereof. In the drawing, the elements are numbered from left to right with Arabic numerals. In each of the examples, the elements, indices of refraction N, Abbe' numbers V, radii of curvature R, thicknesses T, and air spaces S are numbered to correspond with the drawing. The indices of refraction are for the 0.5893 micron sodium D line of the spectrum. The Abbe' numbers are calculated utilizing the D line index and, as the main dispersion, the index difference between the 0.4861 micron hydrogen F line and the 0.6563 micron hydrogen C line. Radii of curvature having centers of curvature to the right of the surface are considered positive; those with centers of curvature to the left of the surface are considered negative.

In all embodiments of the invention as illustrated in the drawing, the lens comprises three air spaced elements. Element 1 is a front positive biconvex element. Element 2 is a middle negative biconcave element. Element 3 is a rear positive biconvex element.

The use of aspheric surfaces in a lens design provides additional parameters for correction of abberations. Incorporation of an aspheric surface is particularly useful in a lens of large relative aperture, because the aspheric surface may be utilized to improve optical performance by controlling higher order spherical aberrations throughout the image field. Moreover, the choice of aspheric surfaces may preclude the necessity of increasing the strength of spherical surfaces to permit reduction in the number of elements, thereby making the lens more manufacturable. In the design of the present invention, the improved aberration correction and the high relative aperture are achieved by the use of aspheres on both surfaces of the middle negative element.

A general aspheric surface may be described by the following equation:

$$x = \frac{Cy^2}{1+\sqrt{1-(1+K)C^2y^2}} + Dy^4 + Ey^6 + Fy^8 + ...$$

This equation describes a surface in terms of its surface sag $x$ at a semi-aperture distance $y$ from the axis of the lens. The constant C is the vertex curvature, that is, the surface curvature at the vertex of the lens, and is equal to the reciprocal of the vertex radius of curvature R. The constant K is the conic constant and is defined by the equation $K = -e^2$ where $e$ is the eccentricity of the surface. Certain values of K describe conic sections or surfaces of revolution about the optical axis of the lens. The coefficients D, E and F determine the higher order aspheric curvature of the surface and are selected to achieve the correction of higher order spherical aberrations throughout the image field.

Lenses may be made according to this invention by following the specifications in the preferred embodiments presented below:

EXAMPLE 1

F=30.00, f/1.80

| Element | $N_D$ | V | Radius mm | Thickness or Separation mm |
|---|---|---|---|---|
| 1 | 1.49168 | 57.4 | $R_1 = 17.819$ | $T_1 = 5.085$ |
|  |  |  | $R_2 = -65.691$ | $S_1 = 3.583$ |
| 2 | 1.56735 | 34.9 | $R_3 =$ Asphere | $T_2 = 1.500$ |
|  |  |  | $R_4 =$ Asphere | $S_2 = 1.315$ |
| 3 | 1.61700 | 54.9 | $R_5 = 19.701$ | $T_3 = 5.856$ |
|  |  |  | $R_6 = -14.316$ |  |

Example I illustrates a projection lens having a relative aperture of 1.80, with an equivalent focal length of 30.00 and a semi-field angle of 6.38°. Relatively inexpensive materials, polymethyl methacrylate and acrylonitrile, have been utilized for Elements 1 and 2. Element 3 is made of a conventional glass. Both surfaces of Element 2 are generally aspheroids and the respective constants and coefficients are tabulated below.

| Surface | C | K | D | E | F |
|---|---|---|---|---|---|
| 3 | −.07232879 | −.00329635 | .00015545 | −.00000270 | .00000002 |
| 4 | .06792195 | .30882718 | .00019064 | −.00000326 | .00000001 |

EXAMPLE II

| Element | $N_D$ | V | Radius mm | Thickness or Separation mm |
|---|---|---|---|---|
| | F=14.00 | | | F/1.80 |
| 1 | 1.49168 | 57.4 | $R_1 = 6.6810$ | $T_1 = 2.238$ |
| | | | $R_2 = -791.39$ | $S_1 = 2.049$ |
| 2 | 1.58984 | 30.8 | $R_3$ = Asphere | $T_2 = 1.000$ |
| | | | $R_4$ = Asphere | $S_2 = 0.955$ |
| 3 | 1.73400 | 51.0 | $R_5 = 11.962$ | $T_3 = 1.991$ |
| | | | $R_6 = -8.3855$ | |

Example II is a projection lens also having a relative aperture of 1.80, with an equivalent focal length of 14.00 and a semi-field angle of 14.34°. Again, relatively inexpensive materials, polymethyl methacrylate and polystyrene, have been utilized for Elements 1 and 2. Element 3 is made of another conventional glass. Both surfaces of Element 2 are aspheric with the conic constant, $K=0$. The respective constants and coefficients for the surfaces are tabulated below.

| Surface | C | D | E | F |
|---|---|---|---|---|
| 3 | −.10672303 | −.00090288 | .00005173 | −.00000043 |
| 4 | .16199022 | −.00045659 | .00001074 | .00000064 |

This invention has been described in detail with particular reference to preferred embodiments thereof, but it will be understood that variations and modifications can be effected within the spirit and scope of the invention.

I claim:

1. A three element lens comprising a front positive element, a middle negative element and a rear positive element, said middle element having two aspheric surfaces and wherein said lens has a focal length of 30.00mm when constructed according to the following parameters:

| Element | $N_D$ | V | Radius mm | Thickness or Separation mm |
|---|---|---|---|---|
| 1 | 1.49168 | 57.4 | $R_1 = 17.819$ | $T_1 = 5.085$ |
| | | | $R_2 = -65.691$ | $S_1 = 3.583$ |
| 2 | 1.56735 | 34.9 | $R_3$ = Asphere | $T_2 = 1.500$ |
| | | | $R_4$ = Asphere | $S_2 = 1.315$ |
| 3 | 1.61700 | 54.9 | $R_5 = 19.701$ | $T_3 = 5.856$ |
| | | | $R_6 = -14.316$ | | wherein, from front to rear, the elements are numbered from 1 to 3, the corresponding indices of refraction, N, and Abbe' numbers, V, are listed for each element, the radii of curvature of the surfaces are numbered from $R_1$ to $R_6$, the thicknesses of the elements are numbered from $T_1$ to $T_3$, the spacings between the elements are numbered from $S_1$ to $S_2$, and wherein $R_3$ and $R_4$ represent the vertex radius of curvature of an aspheric surface defined by the following formula and parameters:

$$x = \frac{Cy^2}{1+\sqrt{1-(1+K)C^2y^2}} + Dy^4 + Ey^6 + Fy^8$$

| Surface | C | K | D | E | F |
|---|---|---|---|---|---|
| 3 | −.07232879 | −.00329635 | .00015545 | −.00000270 | .00000002 |
| 4 | .06792195 | .30882718 | .00019064 | −.00000326 | .00000001 | wherein $x$ is the sag of an aspheric surface from a plane reference surface at a radial distance $y$ from the axis of the lens, C is equal to the reciprocal of the vertex radius of curvature and K is the conic constant.

2. A three element lens comprising a front positive element, a middle negative element and a rear positive element, said middle element having two aspheric surfaces and wherein said lens has a focal length of 14.00mm when constructed according to the following parameters:

| Element | $N_D$ | V | Radius mm | Thickness or Separation mm |
|---|---|---|---|---|
| 1 | 1.49168 | 57.4 | $R_1 = 6.6810$ | $T_1 = 2.238$ |
| | | | $R_2 = -791.39$ | $S_1 = 2.049$ |
| 2 | 1.58984 | 30.8 | $R_3$ = Asphere | $T_2 = 1.000$ |
| | | | $R_4$ = Asphere | $S_2 = 0.955$ |
| 3 | 1.73400 | 51.0 | $R_5 = 11.962$ | $T_3 = 1.991$ |
| | | | $R_6 = -8.3855$ | | wherein, from front to rear, the elements are numbered from 1 to 3, the corresponding indices of refraction, N, and Abbe' numbers, V, are listed for each element, the radii of curvature of the surfaces are numbered from $R_1$ to $R_6$, the thicknesses of the elements are numbered from $T_1$ to $T_3$, the spacings between the elements are numbered from $S_1$ to $S_2$, and wherein $R_3$ and $R_4$ represent the vertex radius of curvature of an aspheric surface defined by the following formula and parameters:

$$x = \frac{Cy^2}{1+\sqrt{1-C^2y^2}} + Dy^4 + Ey^6 + Fy^8$$

| Surface | C | D | E | F |
|---|---|---|---|---|
| 3 | −.10672303 | −.00090288 | .00005173 | −.00000043 |
| 4 | .16199022 | −.00045659 | .00001074 | .00000064 | wherein $x$ is the sag of an aspheric surface from a plane reference surface at a radial distance $y$ from the axis of the lens and C is equal to the reciprocal of the vertex radius of curvature.

* * * * *